United States Patent [19]

Auvray

[11] Patent Number: 5,613,224
[45] Date of Patent: Mar. 18, 1997

[54] PORTABLE MOBILE RADIO TRANSCEIVER

[75] Inventor: Gérard Auvray, Bezons, France

[73] Assignee: Alcatel Radiotelephone, Paris, France

[21] Appl. No.: 587,702

[22] Filed: Jan. 19, 1996

Related U.S. Application Data

[63] Continuation of Ser. No. 194,023, Feb. 9, 1994, abandoned.

[30] Foreign Application Priority Data

Feb. 11, 1993 [FR] France ................................. 93 01532

[51] Int. Cl.[6] .............................. H04B 1/38; H01Q 1/24
[52] U.S. Cl. ............................ 455/89; 455/90; 343/702; 343/882
[58] Field of Search ................................. 455/12.1, 13.1, 455/13.2, 33.1, 89, 90, 128, 97, 129, 269; 343/702, 778, 780, 841, 882, 888; 379/433; H01Q 1/240

[56] References Cited

U.S. PATENT DOCUMENTS

| | | | |
|---|---|---|---|
| 3,435,456 | 3/1969 | Robb, Jr. | 343/702 |
| 3,611,387 | 10/1971 | Stover | 343/702 |
| 3,946,317 | 3/1976 | Ishimara | 343/702 |
| 4,041,497 | 8/1977 | Palmaer | 343/702 |
| 5,218,370 | 6/1993 | Blaese | 343/702 |
| 5,280,635 | 1/1994 | Knoedler et al. | 455/129 |
| 5,394,561 | 2/1995 | Freeburg | 455/13.2 |
| 5,513,383 | 4/1996 | Tsao | 455/90 |
| 5,523,766 | 6/1996 | Erceg | 343/702 |

FOREIGN PATENT DOCUMENTS

| | | |
|---|---|---|
| 0415703A1 | 3/1991 | European Pat. Off. . |
| 590671 | 4/1994 | European Pat. Off. . |
| 2240219 | 7/1991 | United Kingdom . |
| 9309577 | 5/1993 | WIPO . |

OTHER PUBLICATIONS

Base And Mobile Station Antennas For Land Mobile Radio Systems. Yamada et al. "Transactions of the Institute of Electronics. Information and Communication Engineers of Japan", vol. E73, No. 6, Jun. 1991, pp. 1547–1555.

Estabrook et al, "A 20/30 GHz Personal Access Satellite System Design", *IEEE International Conference On Communications*, Jun. 11–14, 1989, vol. 1, pp. 216–220.

*Primary Examiner*—Reinhard J. Eisenzopf
*Assistant Examiner*—Thanh Le
*Attorney, Agent, or Firm*—Sughrue, Mion, Zinn, Macpeak & Seas

[57] ABSTRACT

A portable mobile radio transceiver for direct communication with a radio relay on a satellite comprises a casing with a microphone and an earpiece and an antenna mounted on the casing. The main direction of radiation of the antenna is substantially vertical when the casing is in a position of use in which it is held in the hand near the head of the user.

2 Claims, 1 Drawing Sheet

PORTABLE MOBILE RADIO TRANSCEIVER

This is a Continuation of Application Ser. No. 08/194,023 filed Feb. 9, 1994, abandoned.

BACKGROUND OF THE INVENTION

1. Field of the Invention

The present invention concerns a portable mobile radio transceiver, especially for direct communication with a radio relay station on a satellite, the transceiver including a casing provided with a microphone and an earpiece and an antenna mounted on the casing.

2. Description of the Prior Art

The casing of a transceiver of this kind is generally elongate in shape and its configuration is similar to that of portable terminals for terrestrial mobile radio networks. The casing is primarily intended to be used held in the hand in a position such that the earpiece is near one ear and the microphone near the mouth of the user. In some implementations the casing can also be placed on a support, enabling "hands-free" use of the transceiver.

These transceivers usually have an elongate whip or telescopic type antenna fixed to the casing so that it projects from the latter, being aligned with it in its longitudinal direction.

In the case of portable terminals for direct communication with a satellite the electromagnetic field levels are relatively low and it has been found that a configuration of these transceivers similar to those used in terrestrial mobile radio networks is unsatisfactory.

An object of the invention is to provide a mobile radio transceiver of the above-mentioned type procuring significantly improved transmission and reception. In this regard, it has been found that the radiation diagram of the antenna can be optimized, in particular by a geometrical displacement of the diagram relative to that obtained with the usual configuration.

The invention is further directed to providing a transceiver of this kind which can be held either in the left hand or in the right hand, or mounted on a desktop stand if required.

SUMMARY OF THE INVENTION

The transceiver according to the invention is such that the main direction of radiation of the antenna is substantially vertical when the casing is in the position of use, especially when it is held in the hand near the head of the user. In one implementation of a transceiver of this kind, in which the casing is of elongate shape, the antenna is fixed to the casing so that its main direction of radiation is inclined relative to the longitudinal direction of the casing by an angle substantially equal to the average angle of inclination of the longitudinal direction of the casing to the vertical in the position of use, this average angle of inclination being determined by the relative positions of the ear and the mouth of the user with the head held upright.

In a preferred embodiment of the invention the antenna is orientable on the casing so that it can be placed in a position such that it main direction of radiation is inclined relative to the casing. In this case the casing can be provided with a pivoting antenna support having at least a first locking position corresponding to said direction inclined relative to the casing. The antenna support can have at least one second locking position, the first and second positions respectively corresponding to two orientations of the antenna that are symmetrical relative to the longitudinal direction of the casing and therefore two positions of use in which the casing is respectively held in the right hand or the left hand. The antenna support can also have a third locking position corresponding to an orientation of the antenna in which the main radiation direction is parallel to the longitudinal direction of the casing, enabling use of the casing on a desktop stand.

The invention emerges more clearly from the following detailed description of one implementation of the transceiver given with reference to the appended drawings.

DETAILED DESCRIPTION OF THE PREFERRED EMBODIMENT

Figure 1:
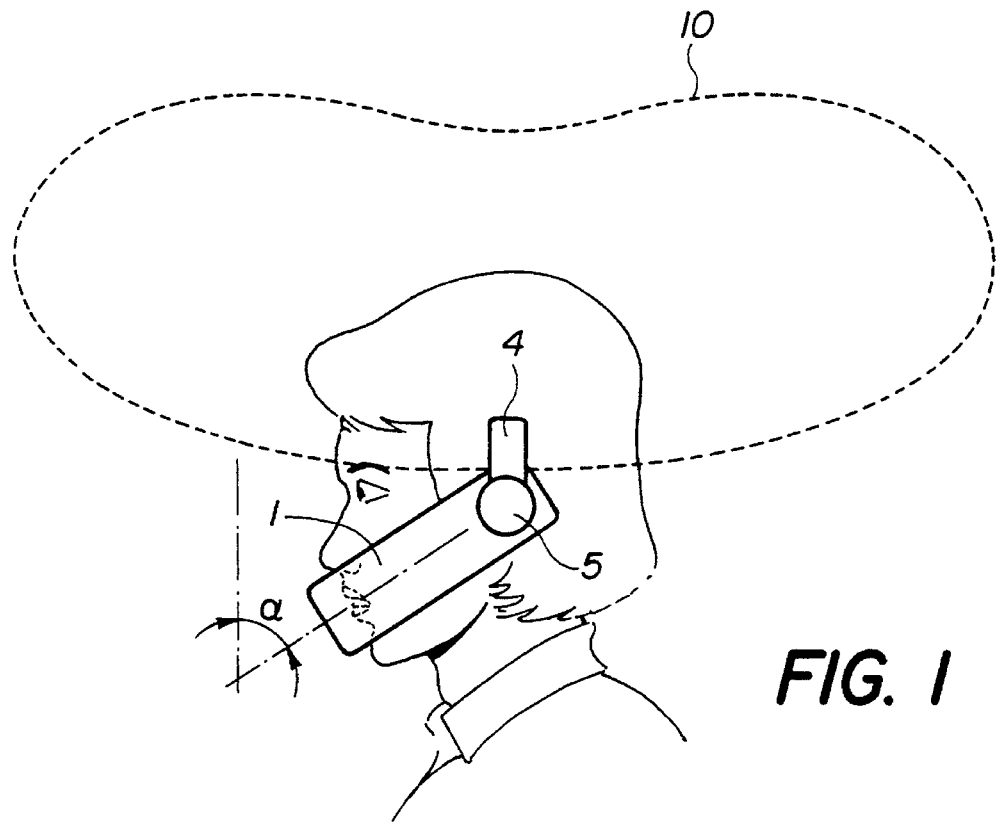
FIG. 1 is a sketch showing the position of use of the casing of the transceiver in accordance with the invention and the optimized radiation diagram of the antenna.
Figure 2:
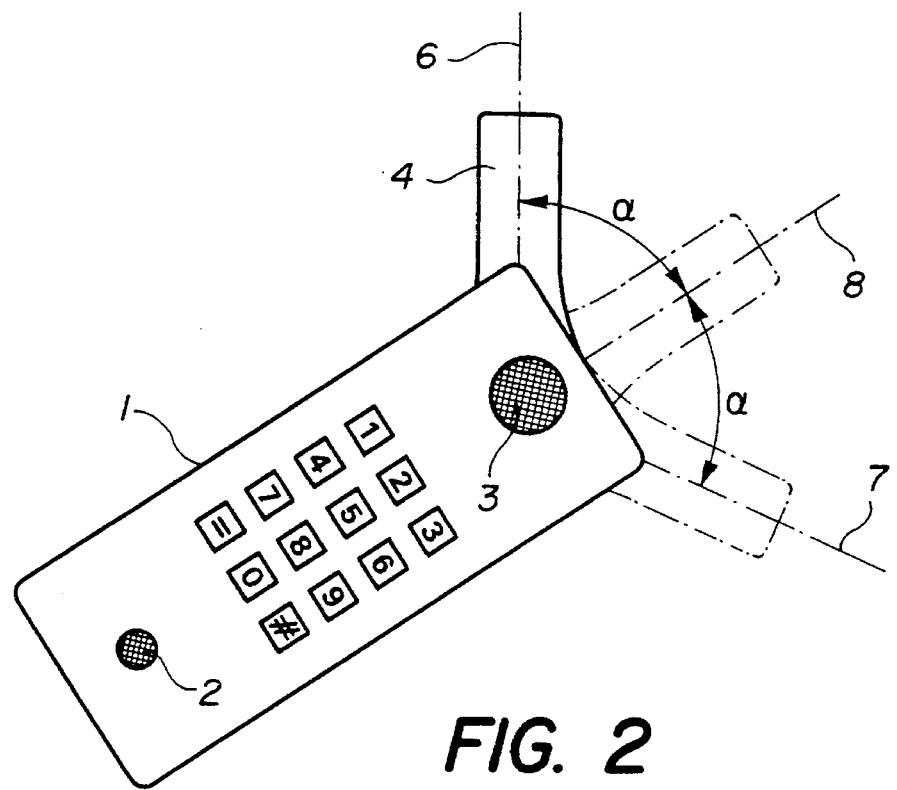
FIG. 2 is a diagrammatic view of the casing of a transceiver in accordance with the invention.

Referring to FIG. 1, when an elongate casing 1 provided with a microphone 2 and an earpiece 3, visible in FIG. 2, is held in the hand in the position of use so that the earpiece is near the ear and the microphone is near the mouth, the longitudinal direction of the casing is at an angle $\alpha$ to the vertical. This angle is determined by the relative positions of the ear and the mouth of the user, with the head held upright. This angle is found to be substantially constant from one user to another.

In this transceiver the casing is provided with an elongate antenna 4 inclined to the longitudinal direction of the casing by an angle substantially equal to $\alpha$ so that the antenna is oriented vertically when the casing is held in the normal position of use. The radiation diagram of the antenna, shown diagrammatically by the dashed line 10 in FIG. 1, is then optimized, the main direction of radiation of the antenna being substantially vertical.

The antenna can be fixed in an inclined position like this or fastened to a pivoting support 5. In an implementation of this kind, as shown diagrammatically in FIG. 2, the antenna 4 can pivot relative to the casing 1, the pivoting support having, for example, a locking position 6 in which the antenna is oriented vertically when the casing is held in the right hand in the position of use.

A pivoting support can have a second locking position 7 in which the antenna 4, shown in chain-dotted outline in FIG. 2, is oriented vertically when the transceiver is held in the left hand. Finally, a third locking position 8 can be provided to position the antenna parallel to the longitudinal direction of the casing when the latter is to be used on a desktop stand.

Although the antenna 4 has been shown by way of example in the form of an elongate antenna, of which the wire type antenna constitutes just one example, it can equally well have other forms, for example a plane structure or a radiating cavity antenna.

In all such cases the invention provides an orientation of the antenna in the position of use such that the main direction of radiation is substantially vertical.

There is claimed:

1. A portable mobile radio transceiver for direct communication with a radio relay station on a satellite, comprising:

a casing with a microphone and an earpiece, said casing having a longitudinal direction; and an antenna mounted on said casing, wherein a main direction of radiation of said antenna is substantially vertical when said casing is in a position of use in which it is held in a hand near the head of a user, and wherein said casing is provided with a pivoting antenna support having a predetermined discrete first locking position and a predetermined discrete second locking position, said first and second locking positions respectively corresponding to two symmetrical orientations of said antenna relative to the longitudinal direction of said casing, and thus, to two positions of said use in which said antenna is substantially vertical when said casing is respectively held in the right hand and the left hand.

2. The transceiver according to claim 1, wherein said pivoting antenna support has a predetermined discrete third locking position corresponding to an orientation of said antenna in which the main direction of radiation is parallel to the longitudinal direction of said casing.

* * * * *